(12) United States Patent
Hunt (10) Patent No.: US 11,106,483 B2
(45) Date of Patent: *Aug. 31, 2021

(54) EXTENT VIRTUALIZATION (71) Applicant: Microsoft Technology Licensing, LLC, Redmond, WA (US)

(72) Inventor: Galen C. Hunt, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 9 days.

This patent is subject to a terminal disclaimer.

(21) Appl. No.: 16/452,761

(22) Filed: Jun. 26, 2019

(65) Prior Publication Data

US 2019/0317794 A1 Oct. 17, 2019

Related U.S. Application Data

(63) Continuation of application No. 13/048,299, filed on Mar. 15, 2011, now Pat. No. 10,338,947.

(51) Int. Cl.
*G06F 9/455* (2018.01)
*G06F 8/60* (2018.01)

(52) U.S. Cl.
CPC ............ *G06F 9/45558* (2013.01); *G06F 8/60* (2013.01); *G06F 2009/4557* (2013.01)

(58) Field of Classification Search
None
See application file for complete search history.

(56) References Cited

U.S. PATENT DOCUMENTS

| 2004/0210591 | A1* | 10/2004 | Hirschfeld | G06F 16/188 |
| 2010/0185827 | A1* | 7/2010 | Lowery | G06F 3/065 |
| | | | | 711/165 |
| 2012/0079229 | A1* | 3/2012 | Jensen | G06F 3/0643 |
| | | | | 711/170 |
| 2012/0167080 | A1* | 6/2012 | Vilayannur | G06F 9/45558 |
| | | | | 718/1 |

* cited by examiner

*Primary Examiner* — Christopher J Raab
(74) *Attorney, Agent, or Firm* — Buckley, Maschoff & Talwalkar LLC (57) ABSTRACT

Files can be segmented into distinct groups and allocated storage units such as blocks. Files associated with parent and child files can be segmented into separate groups, for instance. Further, a group associated with parent files can be extended to include additional blocks reserved for subsequent update. Additionally, metadata can be merged across groups to provide a unified view of the distinct groups.

20 Claims, 7 Drawing Sheets

EXTENT VIRTUALIZATION

CROSS-REFERENCE TO RELATED APPLICATION(S)

This application is a continuation of U.S. patent application Ser. No. 13/048,299, filed Mar. 15, 2011, entitled "EXTENT VIRTUALIZATION". The entirety of this aforementioned application is incorporated herein by reference.

BACKGROUND

Virtual machine technology facilitates increased physical resource utilization as well as agile machine provisioning. Traditionally, software applications are tightly coupled to physical servers on which they run. Virtual machine technology provides a layer of abstraction between the software applications as well as physical hardware and enables provisioning of multiple virtual machines on a single physical server, for example. As a result, workloads can be consolidated to improve physical asset utilization, and machines can be rapidly deployed and decommissioned, as needed.

A virtual machine is a piece of software that emulates a physical computer utilizing a virtual hard disk (VHD), among other things. A VHD is a physical hard disk analogue for a virtual machine. Accordingly, the VHD can include like representations for data and structural elements, such as files and folders. An operating system (OS) (a.k.a. guest operating system) can be installed on the VHD. Further, one or more applications can be installed on the VHD, and the OS can support execution of the one or more applications with respect to the virtual machine.

A VHD can be formatted in one of three distinct manners, namely fixed, dynamic, or differencing. A fixed VHD utilizes a file that is allocated to the size of the virtual hard disk when it was created. A dynamic VHD employs a file that at any given time is large enough to support data written to it plus associated metadata. Accordingly, the VHD file starts small and grows as new blocks are in the disk are used up to the size of the VHD when created. A differencing VHD is a file that represents current state of a virtual disk as a set of modified blocks storing differences in comparison to a parent VHD. A differencing VHD is not an independent disk but rather is linked to another fixed, dynamic, or differencing VHD. Furthermore, a differencing VHD can be utilized in conjunction with a master image.

A master image (a.k.a., golden image) is a virtual machine template that facilitates mass deployment of virtual machines. A virtual machine template is a copy of a VHD that can include an installed operating system, applications, and configurations, among other things. The master image is a useful tool for system administrators, because they do not need to construct a virtual machine from scratch but rather can simply utilize the master image to create a cloned virtual machine. Customizations including additional applications or updates to applications are implemented utilizing a differencing VHD that is linked to a master image VHD. In this manner, the master image remains unchanged while the virtual machine constructed from the master image is modifiable.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to extent virtualization. Files can be segregated into groups as a function of a relationship such as a parent-child relationship. In accordance with one embodiment, the files can correspond to a master-image VHD and one or more dependent differencing VHDs. Further, the space allocated to a parent group, such as a master-image VHD, is extended to include additional reserved space for updates to the parent group. Furthermore, this extended space, or extent, can be virtualized by introducing an additional level of abstraction or indirection. Still, further yet, metadata corresponding to each group can be merged together to present a unified view of the metadata across groups.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Utilizing a master image virtual hard disk (VHD) in combination with one or more differencing VHDs provides many benefits including facilitating generation and deployment of a multitude of virtual machines. Furthermore, a virtual machine can be augmented to include new or different functionality utilizing a differencing VHD. However, a problem exists when one desires to update a master-image VHD, for example to apply a number of software patches and/or service packets. In particular, one of two different outcomes can occur. In one instance, updating the master image overwrites and generates stray differencing VHDs. Alternatively, the master image VHD will not be updated so as avoid the above issues. More specifically, a space allocation collision can occur with respect to existing differencing VHDs and an updated master-image VHD.

Details below are generally directed toward extent virtualization. Files can be segmented into different groups and allocated space based on a group. For instance, parent and child files (e.g., master and differencing VHDs) can be segmented into groups of blocks. Moreover, the group of blocks associated with the parent file (e.g., master-image VHD) can be extended to include additional blocks reserved for subsequent updates. The extended portion, or extent, can furthermore be introduced virtually rather than actually, for example by introducing an extra layer of abstraction or indirection. Furthermore, to facilitate a uniform view, metadata across the groups can be merged.

In accordance with one particular implementation, modifications can be made to a file system(s) (e.g., stored in a VHD(s)) to enable updating of a parent VHD without invalidating dependent differencing VHDs. In other words, a file system can be generated that is differencing aware.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
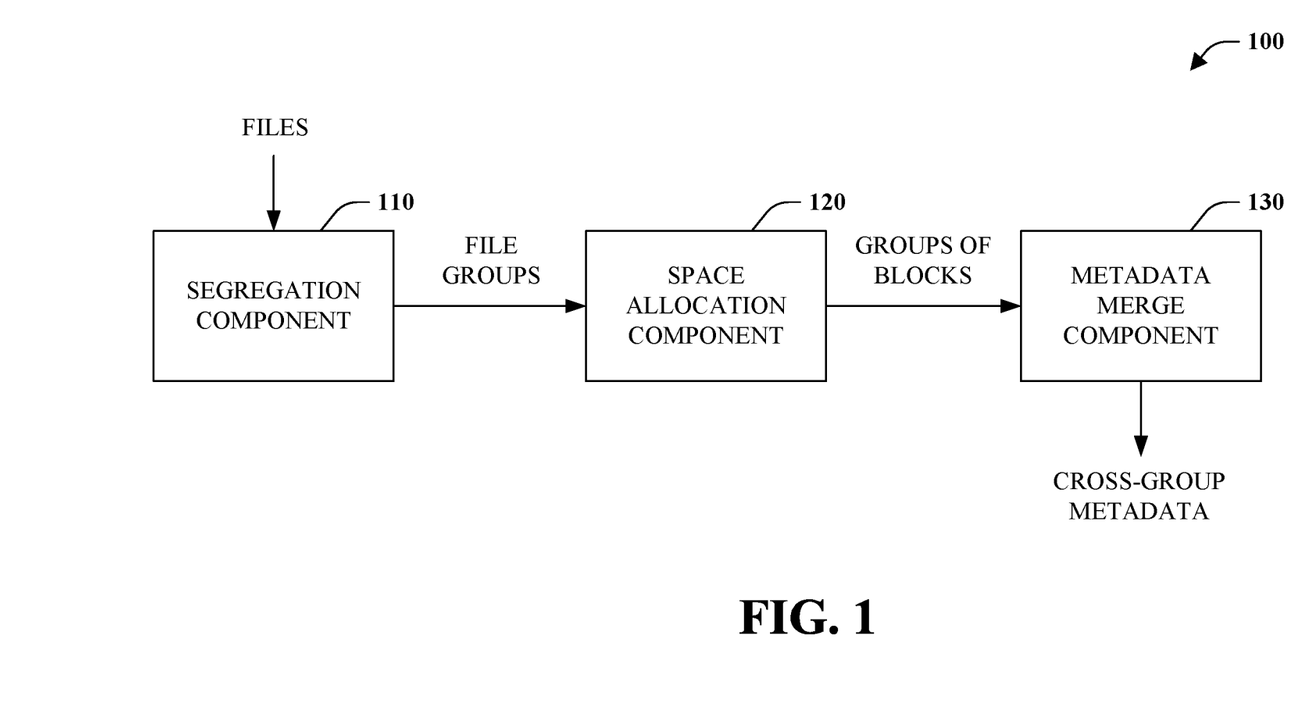
FIG. 1 is a block diagram of an extent virtualization system.

Referring initially to FIG. 1, an extent virtualization system 100 is illustrated that includes segregation component 110, space allocation component 120, and metadata merge component 130. The segregation component 110 receives, retrieves, or otherwise obtains or acquires files, where a file is a collection of computer code or data. For example, a file can correspond to a program, part of a program, or data such as text, audio, video, or a combination thereof. Moreover, the segregation component 110 is configured to segregate, or separate, files into distinct groups. In accordance with one embodiment, files can be separated as a function of a relationship. For example, groups can be established for parent and child files. Although not limited thereto, in one instance the parent files can correspond to a master-image VHD and child files can correspond to one or more differencing VHDs. Of course, various other combinations and permutations are possible and contemplated.

The space allocation component 120 is configured to allocate space for one or more file groups produced by the segregation component 110. More specifically, the space allocation component 120 can identify, or cause to be identified, one or more units of storage, such as blocks (e.g., sequences of bits housing all or part of a file), to store the file groups. Accordingly, each file group can be afforded a group of blocks. Furthermore, the space allocation component 120 can extend the space afforded to one or more groups. For instance, a group associated with parent files can be extended to include additional blocks (an extent) to support subsequent updates, for instance, with respect to fixing, modifying or enhancing functionality provided thereby. By way of example, an update can correspond to a patch or service pack comprised of a plurality of patches. Overall, the space allocation component 120 is configured to allocate, or cause to be allocated, blocks in such a manner to avoid collisions. The number of additional reserved blocks can vary and be determined or otherwise inferred based on historical context information, for example, to ensure collisions are avoided without wasting space.

Figure 2A:
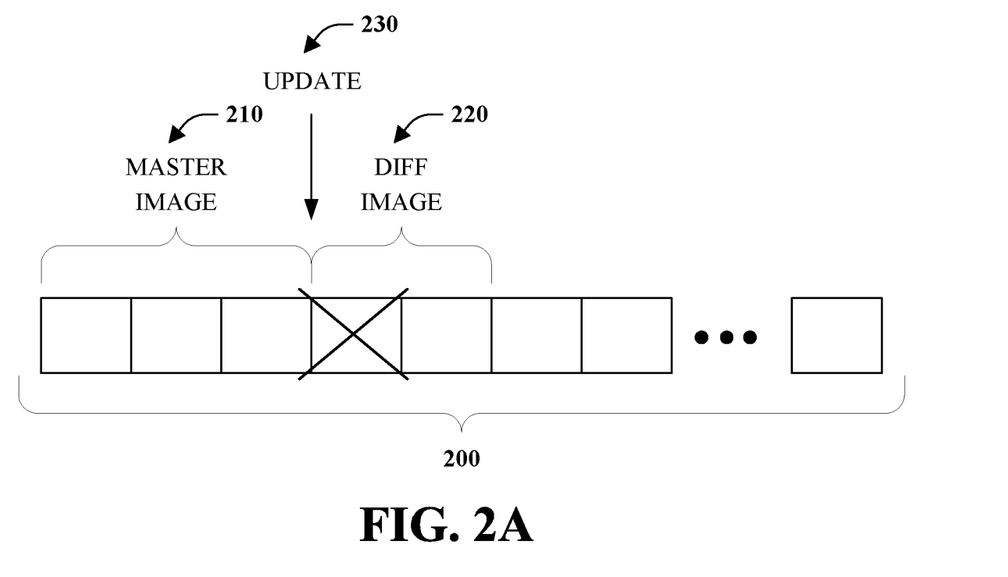
FIGS. 2A-B are block diagrams of exemplary block grouping and allocation schemes.
Figure 2B:
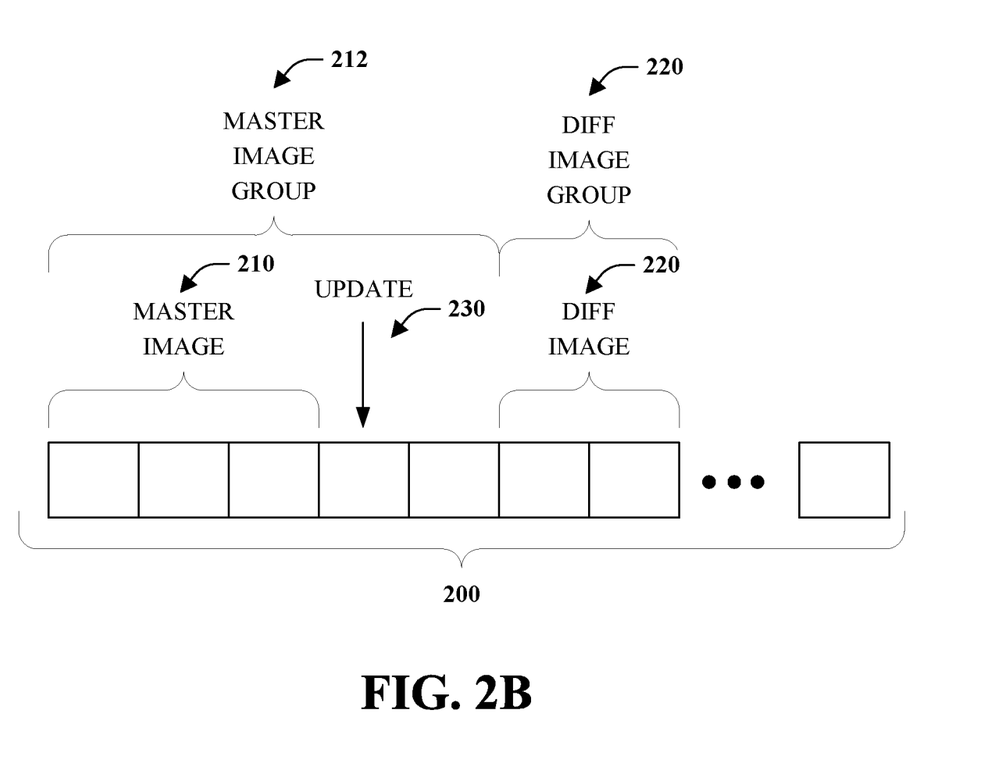

FIGS. 2A-B are provided to aid clarity and understanding with respect to operation of the segregation component 110 and the space allocation component 120. In furtherance thereof, the figures are described with respect to a concrete example, namely placement of files within a master image VHD (a.k.a. master image) and one differencing VHD (a.k.a. differencing image or diff image) into one or more blocks. However, the subject disclosure is not limited thereto.

Turning first to FIG. 2A, a number of blocks 200 that are employable by the segregation component 110 and space allocation component 120 are depicted. The blocks 200 represent units of storage or chunks of data. Conventionally, a master image 210 is loaded into the blocks 200 followed by a differencing image 220. Moreover, the master image 210 and the differencing image 220 are contiguous, and additional blocks follow the differencing image 220 for additional differencing images, for example. The blocks are contiguous because by default file systems use deterministic block allocation algorithms in which blocks allocated to a second file are placed near blocks allocated for a first file. Since the master VHD and differencing VHDs are all part of the same logical file system (e.g., abstract file system defining a user/program view that can include multiple physical file systems, multiple file system implementations . . . ), the file system when applied with the differencing VHD will resume allocating immediately following the blocks of the master VHD. By "immediately following," that is to say, using the same block allocation algorithm as would be used if the file system included solely a single VHD.

Such a scheme provides many benefits including facilitating generation and deployment of a multitude of virtual machines while also allowing a virtual machine to be augmented to include new or different functionality utilizing a differencing image. However, a problem exists when one desires to updated a master image 210 for example to apply a number of software patches and/or service packets (e.g., fix a security vulnerability). As shown, an update 230 to the master image 210 will be injected following the last block of the master image 210, which is occupied by the first block of the differencing image 220. In other words, a space allocation collision occurs. The collision occurs because the master image 210 is updated as the entire contents of the file system, in ignorance of the fact that in another virtual machine the file system includes the master image 210 and the differencing image 220. Consequently, the blocks allocated in the differencing image 220 can be overwritten by blocks allocated in the master image 210, which can result in stray differencing images, among other things. Alternatively, the updated may not be made to avoid overwriting the differencing image 220.

FIG. 2B illustrates the same set of blocks 200, but utilization thereof is modified in accordance with aspects of the disclosure. More specifically, a master image group 212 and differencing image group 222 can be formed where additional space is reserved for the master image group 212. The master image 210 occupies three blocks, as is the case with respect to FIG. 2A. However, the master image group 212 also reserves two additional blocks prior to the contiguous differencing image 220. In this case, the update 230 to the master image 210 can be inserted in the contiguous spaced reserved for updates, which follows the master image 210 but is before the differencing image 220. It is to be noted that the same or similar results can also be achieved utilizing non-contiguous space after the master image 210 (not shown). In any event, an update can be performed without negatively affecting differencing images by way of a collision.

Returning to FIG. 1, recall the extent virtualization system 100 also includes the metadata merge component 130. Separate metadata (e.g., file names, location, time stamps (e.g., add, delete, modify . . . ) . . . ) can be maintained for each group of files. For example, if a master image is updated by modifying a file, the directory hierarchy associated with a master image will reflect this change independent of any dependent differencing images. Accordingly, a problem exists as to how to present metadata uniformly, as if it came from the one source (e.g., metadata collision). The metadata merge component 130 is configured to addresses this issue by merging metadata across groups by way of a "Join" operation or the like, for example.

Figure 3:
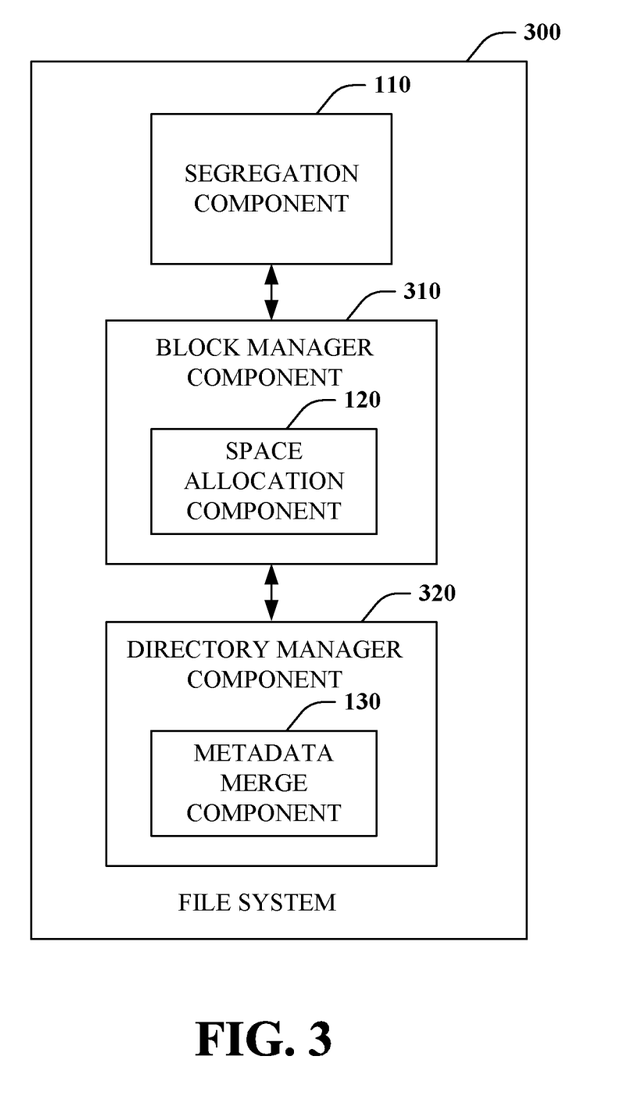
FIG. 3 is a block diagram of a representative file system including the extent virtualization system of FIG. 1.

Turning attention to FIG. 3, a block diagram of a representative file system 300 is illustrated that incorporates the extent virtualization system 100. The file system 300 provides a mechanism for storing files and a directory structure for organization. In other words, the file system 300 determines how files are named, stored, and organized. In furtherance thereof, a conventional abstract logical file system includes a block manager component 310 and a directory manager component 320, wherein the block manager component 310 is configured to manage file storage with respect to data blocks and the directory manager component 320 is configured to manage file directories. Here, however, the directory manager component 320 can be modified to include the metadata merge component 130, and the block manager component 310 can be modified to include the space allocation component 120. Furthermore, the segregation component 110 is configured to segregate, or separate, files into distinct groups (e.g., operating system vs. application, master image vs. differencing . . . ), and can communicate these groups to the block manager component 310. Subsequently, the block manager component 310, augmented by space allocation component 120, can generate blocks for the groups including reserved portions or extents. Subsequently, the extent to which a file is added can be the most dependent differencing VHD mounted in a virtual machine, and if there is no differencing VHD mounted in the virtual machine, because it is a master virtual machine, the extent of the master VHD can be employed. The directory manager component 320 can then organize the files wherein metadata across VHDs is merged by the metadata merge component 130.

Integration of the extent virtualization system 100 provides a layer of abstraction, or indirection, on top of a conventional file system that, among other things, groups files and allocates space for the groups of files in a particular manner. Accordingly, extents are virtualized as opposed to actualized. Similar to other virtualization technologies (e.g., virtual applications, virtual machines . . . ), here the file system can be fooled into providing additional space for a parent group. For example, the space allocation component 120 can record a larger size for the master image group than is actually needed to accommodate additional space for updates.

Note that a file system can natively support extents (e.g., extent-based file system) where an additional area of contiguous or non-contiguous space is allocated for a file. Here, however, virtual extents are created which may or may not be implemented utilizing actual file system extents. In fact, it is possible for virtual extents and actual extents to coexist. What's more, such virtual extents are created with respect to particular groups of files.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the space allocation component 120 can include such mechanism to determine or infer an extent to which a group is to be extended to support subsequent updates while also preserving space, for instance.

Figure 4:
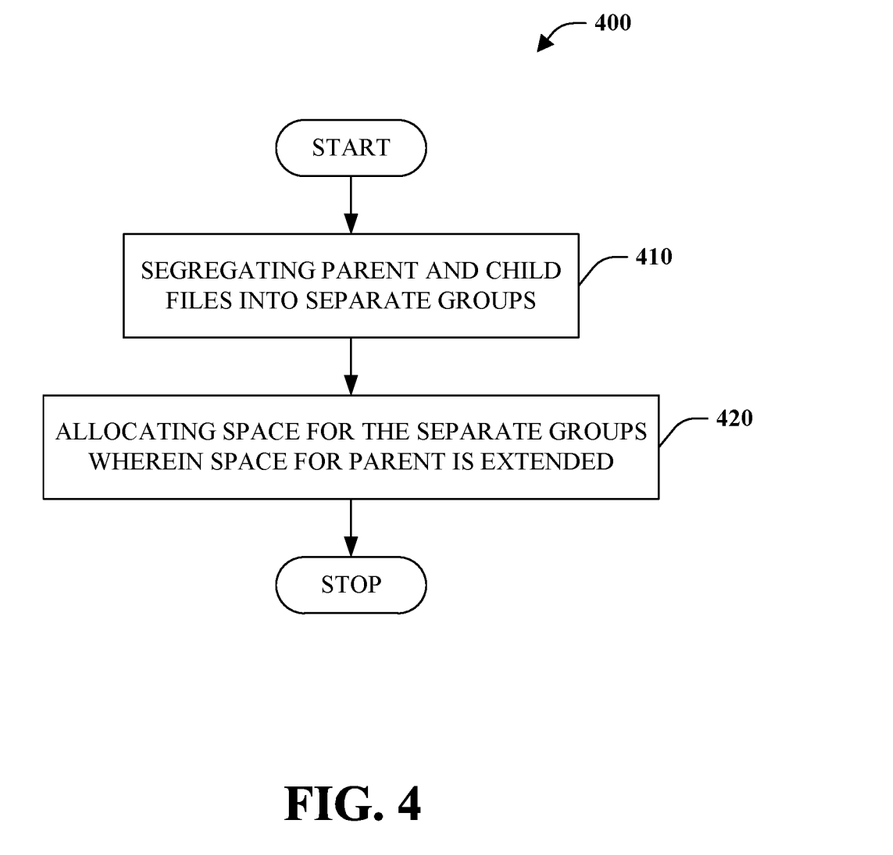
FIG. 4 is a flow chart diagram of a method of extent virtualization.
Figure 5:
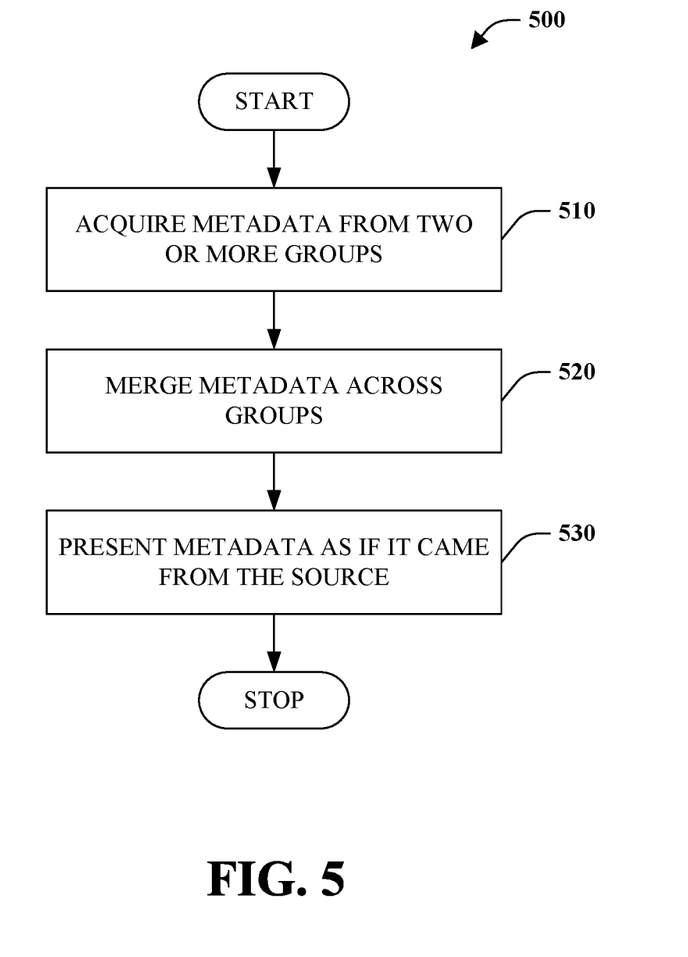
FIG. 5 is a flow chart diagram of a method of metadata management.
Figure 6:
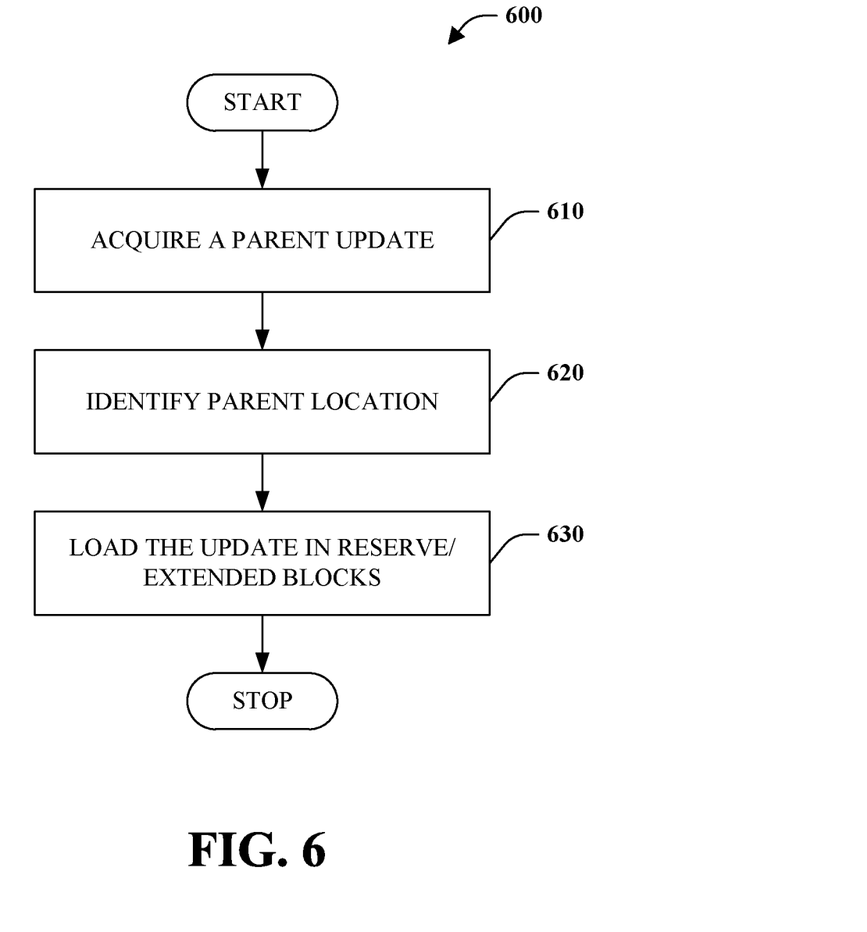
FIG. 6 is a flow chart diagram of an update method.

In view of the exemplary systems described supra, methodologies that may be implemented in accordance with the disclosed subject matter will be better appreciated with reference to the flow charts of FIGS. 4-6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 4, illustrates a method 400 of extent virtualization. At reference numeral 410, parent and child files are segregated into separate groups. At numeral, 420, space is allocated for the separate groups. Moreover, space for a parent is extended to include space reserved for subsequent updates, for example. In accordance with one embodiment, the parent can correspond to a master image VHD and the child can correspond to one or more differencing image VHDs. Of course, the claim subject matter is not limited thereto. Furthermore, note that the subject method 400 pertains to generation of virtual extents as opposed to actual extents in a manner analogous to the difference between virtual machines and actual physical machines or virtual applications and non-virtual applications. For instance, the file system can be tricked, by way of an extra layer of abstraction or indirection, into believing a file or group of files needs more space than is actually required.

FIG. 5 is a flow chart diagram of a method of metadata management 500. At reference numeral 510, metadata from two or more groups is received, retrieved, or otherwise obtained or acquired, wherein the metadata (e.g., change status, root directory . . . ) is maintained locally to a group. At numeral 520, metadata is merged across the groups perhaps by using join function. At reference numeral 530, the merged metadata is presented as if the metadata came from a single source.

FIG. 6 depicts a method of updating in accordance with an aspect of the subject disclosure. At reference numeral 610, an update to a parent group files, or image, is received, retrieved, or otherwise obtained or acquired. At numeral 620, the location of the parent group image is identified. At reference numeral 630, the updated is loaded into the reserved/extended blocks such as but not limited to a contiguous area following the last file of the parent group image.

It should be appreciated that aspects of the disclosed subject matter can be applied with respect to a legacy scheme. By way of example, and not limitation, a master-image VHD and one or more differencing VHDs can be acquired, wherein the master-image VHD is contiguous with the one or more differencing VHDs and un-extended. Extent virtualization can then be applied to this legacy representation.

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
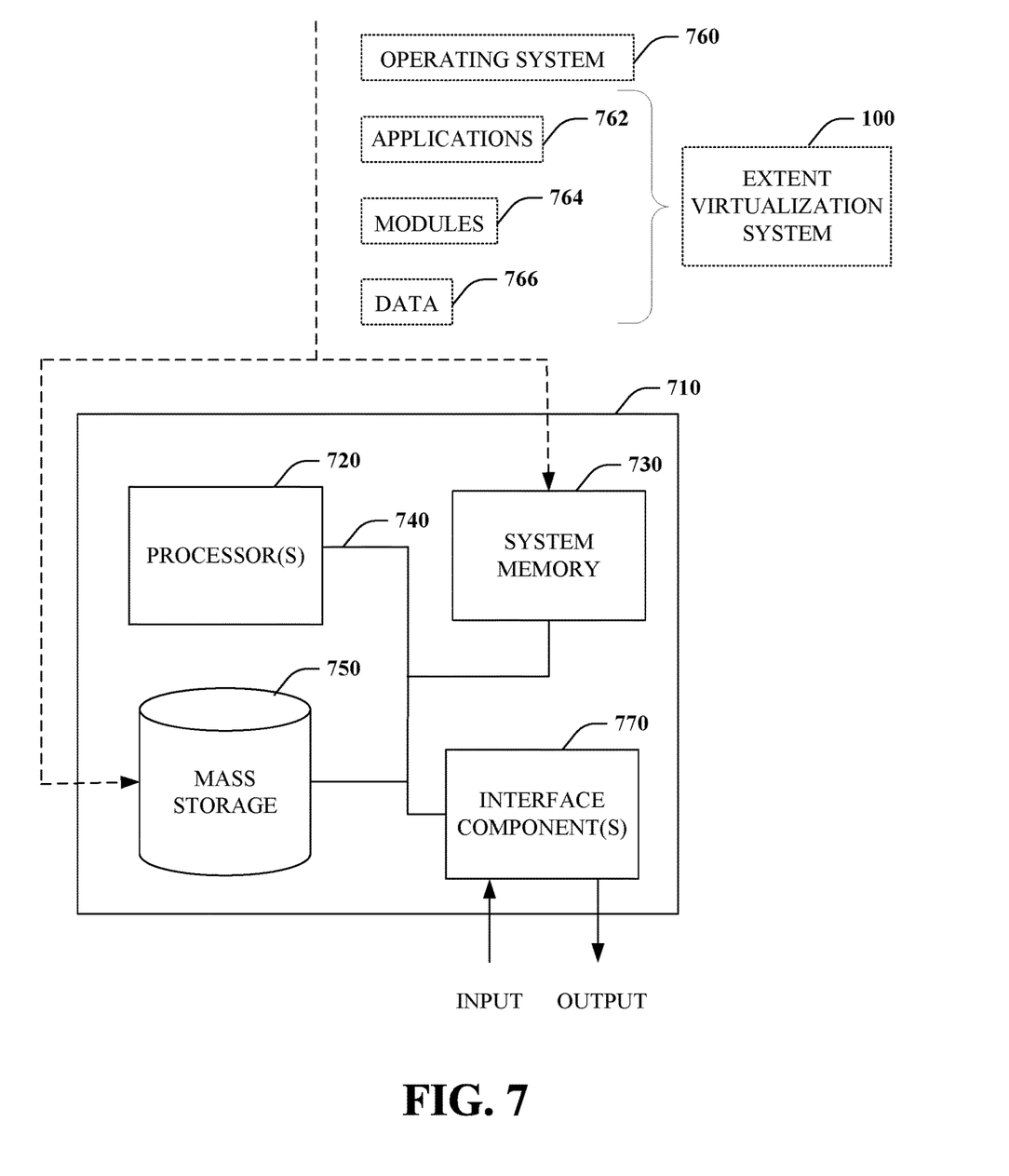
FIG. 7 is a schematic block diagram illustrating a suitable operating environment for aspects of the subject disclosure.

In order to provide a context for the claimed subject matter, FIG. 7 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 7, illustrated is an example general-purpose computer 710 or computing device (e.g., desktop, laptop, server, hand-held, programmable consumer or industrial electronics, set-top box, game system . . . ). The computer 710 includes one or more processor(s) 720, memory 730, system bus 740, mass storage 750, and one or more interface components 770. The system bus 740 communicatively couples at least the above system components. However, it is to be appreciated that in its simplest form the computer 710 can include one or more processors 720 coupled to memory 730 that execute various computer executable actions, instructions, and or components stored in memory 730.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration.

The computer 710 can include or otherwise interact with a variety of computer-readable media to facilitate control of the computer 710 to implement one or more aspects of the claimed subject matter. The computer-readable media can be any available media that can be accessed by the computer 710 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 710.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 730 and mass storage 750 are examples of computer-readable storage media. Depending on the exact configuration and type of computing device, memory 730 may be volatile (e.g., RAM), non-volatile (e.g., ROM, flash memory . . . ) or some combination of the two. By way of example, the basic input/output system (BIOS), including basic routines to transfer information between elements within the computer 710, such as during start-up, can be stored in nonvolatile memory, while volatile memory can act as external cache memory to facilitate processing by the processor(s) 720, among other things.

Mass storage 750 includes removable/non-removable, volatile/non-volatile computer storage media for storage of large amounts of data relative to the memory 730. For example, mass storage 750 includes, but is not limited to, one or more devices such as a magnetic or optical disk drive, floppy disk drive, flash memory, solid-state drive, or memory stick.

Memory 730 and mass storage 750 can include, or have stored therein, operating system 760, one or more applications 762, one or more program modules 764, and data 766. The operating system 760 acts to control and allocate resources of the computer 710. Applications 762 include one or both of system and application software and can exploit management of resources by the operating system 760 through program modules 764 and data 766 stored in memory 730 and/or mass storage 750 to perform one or more actions. Accordingly, applications 762 can turn a general-purpose computer 710 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the extent virtualization system 100, or portions thereof, can be, or form part, of an application 762, and include one or more modules 764 and data 766 stored in memory and/or mass storage 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the extent virtualization system 100 and/or associated functionality can be embedded within hardware in a SOC architecture.

The computer 710 also includes one or more interface components 770 that are communicatively coupled to the system bus 740 and facilitate interaction with the computer 710. By way of example, the interface component 770 can be a port (e.g., serial, parallel, PCMCIA, USB, FireWire . . . ) or an interface card (e.g., sound, video . . . ) or the like. In one example implementation, the interface component 770 can be embodied as a user input/output interface to enable a user to enter commands and information into the computer 710 through one or more input devices (e.g., pointing device such as a mouse, trackball, stylus, touch pad, keyboard, microphone, joystick, game pad, satellite dish, scanner, camera, other computer . . . ). In another example implementation, the interface component 770 can be embodied as an output peripheral interface to supply output to displays (e.g., CRT, LCD, plasma . . . ), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, comprising:

employing at least one processor configured to execute computer-executable instructions stored in memory to perform the following operations:

identifying a first set of one or more storage blocks to be allocated for storage of a master-image virtual hard disk;

extending the first set of one or more storage blocks by one or more additional storage blocks reserved for patches to the master-image virtual hard disk different from updates to the master-image virtual hard disk that are represented by one or more differencing virtual hard disks, wherein the one or more differencing virtual hard disks are dependent on the master-image virtual hard disk;

allocating space for the extended first set of storage blocks for the master-image virtual hard disk and for the patches to the master-image virtual hard disk;

allocating additional space for a second set of storage blocks for the one or more differencing virtual hard disks; and merging local metadata associated with the master-image virtual hard disk with local metadata associated with the one or more differencing virtual hard disks.

2. The method of claim 1, wherein the operations further comprise:
loading a patch comprising one or more fixes or enhancements in the one or more additional storage blocks.

3. The method of claim 2, wherein loading the patch comprises loading one or more fixes or enhancements to an operating system on the master-image virtual hard disk.

4. The method of claim 3, wherein at least one of the one or more differencing virtual hard disks includes an application compatible with the operating system.

5. The method of claim 4, wherein at least one of the one or more differencing virtual hard disks includes an update to the application.

6. The method of claim 1, wherein the operations further comprise:
determining a number of storage blocks to reserve automatically as a function of historical context.

7. The method of claim 1, wherein the operations further comprise:
causing the first set of storage blocks and the second set of storage blocks to be allocated by the file system.

8. A computing device, comprising:
a memory and a processor, wherein the memory and the processor are respectively configured to store and execute computer-executable instructions to cause the computing device to:
identify a first set of storage blocks to be allocated for a master-image virtual hard disk;
extend the first set of storage blocks by one or more additional storage blocks for patches to the master-image virtual hard disk;
allocate a first space range in a file system for the extended first set of storage blocks for the master-image virtual hard disk, and for the patches to the master-image virtual hard disk, wherein the one or more patches are different than updates captured by one or more differencing virtual hard disks; and
allocate an additional space range in the file system for a second set of storage blocks for the one or more differencing virtual hard disks, wherein the one or more differencing virtual hard disks are dependent on the master-image virtual hard disk; and
merge metadata across the storage blocks for the master-image virtual hard disk and the one or more differencing virtual hard disks.

9. The computing device of claim 8, wherein the computer-executable instructions are stored in the file system.

10. The computing device of claim 8, wherein the computer-executable instructions are also for causing the computing deviceto:
infer a number of reserved storage blocks as a function of context.

11. The computing device of claim 8, wherein the first set and the second set are stored on a data source.

12. The computing device of claim 8, wherein the master-image virtual hard disk includes an operating system.

13. The computing device of claim 8, wherein the computer-executable instructions are also for causing the computing device to:
cause the first set of storage blocks and the second set of storage blocks to be allocated by the file system.

14. A computer-readable storage medium having instructions stored thereon that enable at least one processor to perform a method upon execution, the method comprising:
identifying a set of storage blocks for allocation for a master-image virtual hard disk;
extending the set of storage blocks for allocation to the master-image virtual hard disk by one or more additional blocks for storage of updates to the master-image virtual hard disk;
allocating a first location, in a file system for the extended set of storage blocks for the master image virtual hard disk and for updates to the master-image virtual hard disk, wherein the updates to the master-image virtual hard disk are not included in one or more differencing virtual hard disks;
allocating a second location for additional storage blocks for the one or more differencing virtual hard disks, wherein the one or more differencing virtual hard disks are dependent on the master-image virtual hard disk; and
merging metadata across the master-image virtual hard disk and the one or more differencing virtual hard disks.

15. The computer-readable storage medium of claim 14, wherein the method further comprises:
causing the storage blocks to be allocated by the file system.

16. The computer-readable storage medium of claim 14, wherein the method further comprises:
loading a patch comprising one or more fixes or enhancements in the one or more additional storage blocks.

17. The computer-readable storage medium of claim 16, wherein loading the patch comprises loading one or more fixes or enhancements to an operating system on the master-image virtual hard disk.

18. The computer-readable storage medium of claim 17, wherein at least one of the one or more differencing virtual hard disks includes an application compatible with the operating system.

19. The computer-readable storage medium of claim 18, wherein at least one of the one or more differencing virtual hard disks includes an update to the application.

20. The computer-readable storage medium of claim 14, wherein the method further comprises:
determining a number of storage blocks to reserve automatically as a function of historical context.

* * * * *